United States Patent [19]

Dantlgraber et al.

[11] Patent Number: 4,463,929
[45] Date of Patent: Aug. 7, 1984

[54] PRESSURE RESPONSIVE VALVE

[75] Inventors: Joerg Dantlgraber, Lohr-Sackenbach; Albert Mueller, Achaffenburg, both of Fed. Rep. of Germany

[73] Assignee: Mannesmann Rexroth GmbH, Lohr (Main), Fed. Rep. of Germany

[21] Appl. No.: 351,885

[22] Filed: Feb. 24, 1982

[30] Foreign Application Priority Data

Feb. 28, 1981 [DE] Fed. Rep. of Germany ....... 3107775

[51] Int. Cl.³ ............................................. F16K 31/12
[52] U.S. Cl. ...................................... 251/44; 251/77; 251/337
[58] Field of Search .................. 251/43, 44, 45, 77, 251/80, 337

[56] References Cited

U.S. PATENT DOCUMENTS

| | | | |
|---|---|---|---|
| 2,980,139 | 4/1961 | Lynn | 251/77 |
| 3,118,648 | 1/1964 | Campbell | 251/77 |
| 3,236,256 | 2/1966 | Valentine | 251/77 |

FOREIGN PATENT DOCUMENTS 2952237  7/1980  Fed. Rep. of Germany .

Primary Examiner—Ronald C. Capossela
Attorney, Agent, or Firm—Walter C. Farley

[57] ABSTRACT

A pressure valve has a valve member 22 which can be lifted from its seat against the effect of a valve spring 25, 26 and a control piston 12 which is movable coaxially to the valve member, and a connection passage 15, 21, 23 having a throttle point 16 extending from the pressure side of the valve member to an opening on the side of piston 12 which faces away from the valve member. In order that the valve limit pressure peaks with a simple structure, the valve spring abuts on the control piston and the surface of the valve member on which pressure acts is smaller than the surface of the control piston on which pressure acts and which connected to the valve member surface through the connection passage.

6 Claims, 1 Drawing Figure

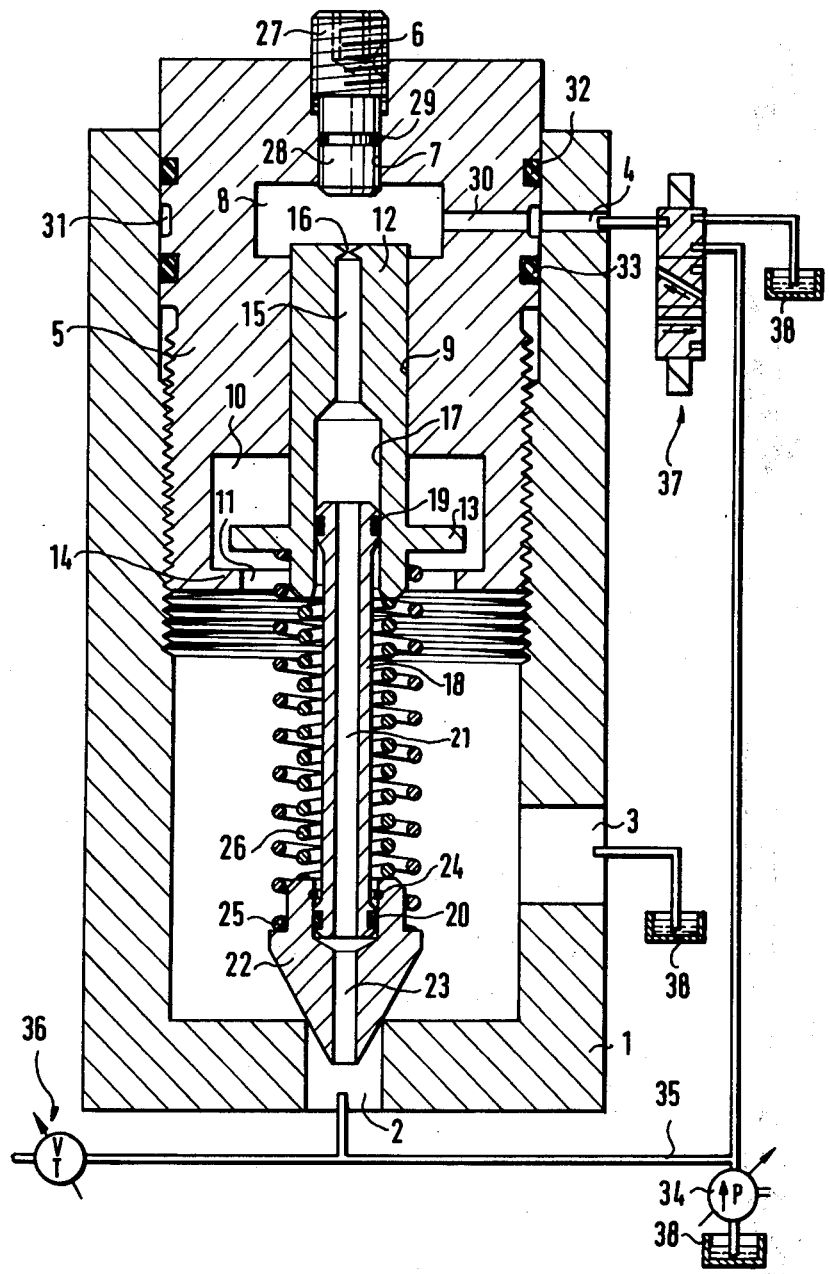

PRESSURE RESPONSIVE VALVE

SPECIFICATION

This invention relates to a pressure responsive valve of the type having a valve member, valve spring means for urging the valve member toward a valve seat at a pressure inlet opening, a control piston movable relative to the valve member, and means defining a connection passage having a throttle point therein, the passage extending from the pressure responsive side of the valve member to the pressure responsive side of the control piston.

BACKGROUND OF THE INVENTION

In a known pressure responsive valve of the general type to which the invention relates, a valve spring extends between and abuts a stationary part and a valve face which is movable. The surface on which pressure acts on the pressure side of the valve member is the same size as the surface on which pressure acts on the exposed side of a control piston which is connected to the pressure side of the valve member through a connection passage, the control piston being actuated by a proportional electromagnet. However, the path of the pressure agent to the valve member is encumbered with resistances with the result that changes of pressure at the inlet do not lead to an increase of the opening pressure of the valve member. A structure of this type is shown in German OS No. 29 52 237.

BRIEF DESCRIPTION OF THE INVENTION

An object of the present invention is to provide a configuration of a pressure valve such that pressure peaks can be limited with simple hydraulic techniques.

Briefly described, the invention includes a pressure valve of the type having a valve member, valve spring means for urging the valve member toward a valve seat at a pressure opening, a control piston coaxially movable relative to the valve member, and means defining a connection passage having a throttle point therein, the passage extending from the pressure side of the valve member to the control piston, the improvement wherein said valve spring means extends between and acts on the valve member and the control piston and said valve member and control piston are dimensioned such that the pressure responsive surface on the pressure side of the valve member is smaller than the pressure responsive surface of the control piston in fluid communication with said surface of said valve member through said connection passage.

With this structure, the control piston can vary its position relative to the closed valve member, permitting, at the same time, the force of the valve spring on the valve member to be changed. With a sudden increase of pressure on the pressure side of the valve member, the valve member opens, whereas the build up of pressure working in the closing direction is delayed by the throttle point in the connection passage. The pressure valve can easily be adapted to different structural conditions by variation of the cross-section of this throttle point.

Additional features of the invention are that it can be used as a maximum pressure valve and, when connected differently, as a minimum pressure valve. The minimum pressure can also be made to minimally depend upon the volumetric displacement.

In order that the manner in which the foregoing and other objects are attained in accordance with the invention can be understood in detail, a particularly advantageous embodiment thereof will be described with reference to the accompanying drawing, which forms a part of this specification, and which shows a side elevation, in section, of an apparatus in accordance with the invention connected in a schematic fluid circuit.

As will be seen, the device is shown in use together with a pump the volumetric displacement of which can be regulated and which is provided with a pressure regulator.

Referring now to the drawing in detail, the apparatus includes a sleeve-like valve housing 1 having a connection bore 2 in its base, a connecting bore 3 in a cylindrical wall thereof, and a control bore 4 in the area of the free end of the valve and on one side. A plug member 5 is screwed into the free end of the valve housing and its position relative to the interior of the valve housing can be adjusted as desired by changing the extent of threaded engagement into the housing. Plug 5 has a graduated axially extending central bore which, as viewed progressively from the outside to the inside, includes an internally threaded part 6, a smooth-walled packing part 7, a control chamber 8 which is of larger diameter than portion 7, a bearing part 9 which is smaller in diameter than chamber 8, a receiving chamber 10 which is of larger diameter than portion 9, and a passage portion 11 of smaller diameter than chamber 10.

A control piston 12 is axially movably received in bearing part 9 of the bore in plug 5, the piston having a radially outwardly projecting flange 13 which is received within chamber 10 and which cooperates with stop collar 14, forming a limiting passage part 11 on one side of piston 12, and cooperates with the opposite wall of chamber 10 on the other side. In a practical construction, stop collar 14 is detachably coupled to stopper 5 so that, during assembly, flange 13 can be inserted into chamber 10. Control piston 12 has a graduated central bore 15 which has a throttle point 16 near the end thereof adjacent control chamber 8 and has a tubular bearing portion 17 to receive one of the ends of a connection element 18, in the end opposite throttle 16. Both ends of connection element 18 are reinforced by a somewhat spherically shaped enlargement protruding radially, and each end has an annular groove to receive a packing ring 19 and 20. The end of connection element 18 which carries packing ring 19 is axially movable in and relative to bearing portion 17. The tubular connection element 18 has a central axial bore 21.

The other end of connection element 18, which is provided with a packing ring 20, projects into a conical valve member 22 on the side thereof which faces away from its conical valve surface. Valve member 22 has a central bore 23 which widens to receive the reinforced end of the connection element 18. The end of element 18 is coupled to the valve member by a spring ring 24 and the shoulder in valve member 22 which is formed by widening of the central bore. Valve member 22 sits, in its closed position, on that edge of opening 2 which is turned toward the valve surface.

Two valve springs 25 and 26 are coaxially arranged and configured as helical springs between control piston 12 and valve member 22. Valve spring 25 is relatively stiff and has a predetermined degree of extension in its relaxed state which does not permit it to stretch sufficiently to extend to all of the positions which can be occupied by control piston 12, whereas valve spring 26 is "soft" or relatively less stiff, and has a greater relaxed length so that it can stretch into all positions which can be occupied by control piston 12. The diameter of bore 2 is slightly smaller than the diameter of control piston 12 or of bearing part 9 of the middle bore in plug 5.

A stop screw 27 has a cylindrical portion 28 which has an annular groove carrying a packing ring 29, the stop screw being screwed into threaded part 6 of the central bore of plug 5. Control chamber 8 is connected through a bore 30 with an annular groove 31 provided on the periphery of plug 5 which is in communication with control bore 4. Packing rings 32 and 33 which seal the gap between plug 5 and housing 1 are provided on both sides of annular groove 31.

The pressure side of a pump 34, the volumetric displacement of which is adjustable by pressure regulation, is connected by a line 35 directly to connection bore 2. An adjustable throttle 36, which represents a variable load, is connected after the connection point to line 35. A three position, three port valve 37 is connected with one port leading to pump 34, a second port connected to a reservoir 38 and a third port connected to control bore 4. The connecting bore 3 is also connected to reservoir 38.

With constant operating pressure, and with valve 37 in the position shown in the drawing, the pressure valve is closed and valve member 22 is held against its seat by valve springs 25, 26. The operating pressure acts through central bores 23, 21 and 15 to control chamber 8 and exerts pressure against surface 12a, pressing control piston 12 in the direction of valve member 22. Since the diameter of the surface 12a of piston 12 on which pressure acts is greater than the diameter of valve member 22 exposed to bore 2, the force exerted through spring 25, 26 is greater than the force exerted by the operating pressure on valve member 22 and bore 2 is closed.

With a sudden rise in the pressure on the pressure side of pump 34, the opening force working on the exposed portion of valve member 22 is greater than the force working in the opposite direction since, because of throttle point 16, the increased pressure does not instantly reach control chamber 8. Thus, valve member 22 is lifted from its seat and pressure agent flows through connection bore 2 into the inner chamber of valve housing 1 and through bore 3 to the reservoir 38. In the course of time, the pressure also rises in control chamber 8, whereupon control piston 12 is moved in the direction of valve member 22 until the operating pressure is reached. Shortly before reaching the operating pressure, the valve closes, and valve member 22 again is seated on the inner edge of connection bore 2.

However, if the pressure on the pressure side of pump 34 is increased slowly, then the pressure in control chamber 8 also rises slowly and the force exerted on valve member 22 tending to keep it in its closed position is increased. The extent of movement controlled by control piston 12 is limited by contact of flange 13 with stop collar 14. Thus, the maximum initial force of springs 25, 26 and thus the maximum pressure of the valve is also limited. The structure thus operates as a maximum pressure valve. The level of maximum pressure can be varied by changing the position of plug 5 relative to valve housing 1.

As mentioned, during the above described operating condition, the control part of multi-way valve 37 is in the position shown in the drawing, that position being one in which the connection between bore 4 and either pump 34 or reservoir 38 is interrupted. If one now assumes that valve 37 is moved until bore 4 is connected with reservoir 38 so that control chamber 8 can be vented, control piston 12 is pressed by the force of valve springs 25, 26 against stop screw 27 which sets the minimum controllable pressure for a discharge valve. If the extent of movement of control piston 12 is so great in the direction toward stop screw 27 that valve spring 25 is relaxed, then only the relatively soft valve spring 26 is active. Thus, only a slight dependence of the minimum pressure upon the volumetric displacement of pump 34 is attained. After the minimum pressure with the working pump is reached, it is rather a short time until the operating pressure is reached again. In order to cause the pressure valve in shortest possible time to move from its operating condition at the minimum pressure limit to its operating condition at its maximum pressure limit, pump 34 is connected through multi-way valve 37, control bore 4 and bore 30 with control chamber 8, thus bypassing throttle point 16.

The maximum pressure of the valve can alternatively be limited by stop collar 14 by means of a pressure relief valve connected to control chamber 8, the pressure relief valve being preferably adjustable in its limit pressure.

While one advantageous embodiment has been chosen to illustrate the invention it will be understood by those skilled in the art that various changes and modifications can be made therein without departing from the scope of the invention as defined in the appended claims.

What is claimed is:

1. A pressure valve of the type having a valve member, valve spring means for urging the valve member toward a valve seat at a pressure opening, a control piston coaxially movable relative to the valve member, and means defining a connection passage having a throttle point therein, the passage extending from the pressure side of the valve member to the control side of the control piston, the improvement wherein said valve spring means extends between and acts on the valve member and the control piston; and said valve member and control piston are dimensioned such that the pressure responsive surface on the pressure side of the valve member is smaller than the pressure responsive surface of the control piston in fluid communication with said surface of said valve member through said connection passage.

2. A valve according to claim 1, 3 or 5 and further comprising an interior stop collar positioned to limit movement of said control piston in the direction toward said valve member.

3. A pressure valve of the type having a valve member, valve spring means for urging the valve member toward a valve seat at a pressure opening, a control piston coaxially movable relative to the valve member, and means defining a connection passage having a throttle point therein, the passage extending from the pressure side of the valve member to the control piston, the improvement wherein said valve spring means extends between and acts on the valve member and the control piston; and said valve member and control piston are dimensioned such that the pressure responsive surface on the pressure side of the valve member is smaller than the pressure responsive surface of the control piston in fluid communication with said surface of said valve member through said connection passage;

said valve further comprising selectively operable multiway valve means connected to said pressure valve for connecting said piston to one of a pressure source, a reservoir or a block, and wherein said valve includes an adjustable stop screw for limiting movement of said control piston in the direction away from said valve member.

4. A valve according to claim 3 wherein said spring means comprises a first spring having a predetermined relaxed length and stiffness and a second spring acting in parallel with said first spring and having a greater relaxed length and less stiffness than said first spring, the lengths of said springs being chosen such that said second spring continues to act on said control piston when said piston has moved beyond the extension of said first spring.

5. A pressure valve of the type having a valve member, valve spring means for urging the valve member toward a valve seat at a pressure opening, a control piston coaxially movable relative to the valve member, and means defining a connection passage having a throttle point therein, the passage extending from the pressure side of the valve member to the control piston, the improvement wherein said valve spring means extends between and acts on the valve member and the control piston; and said valve member and control piston are dimensioned such that the pressure responsive surface on the pressure side of the valve member is smaller than the pressure responsive surface of the control piston in fluid communication with said surface of said valve member through said connection passage, said valve further comprising a connection element extending between and coupled to said control piston and said valve member, said element being axially slidable relative to at least one of said piston and valve member, said means defining said connection passage including said piston, said element and said valve member, said throttle point being in said piston.

6. A valve according to claim 5 and including a control chamber connected to a pressure relief valve.

* * * * *